United States Patent
Muramoto (10) Patent No.: US 6,405,837 B1
(45) Date of Patent: Jun. 18, 2002

(54) COMBINED PARKING AND SERVICE BRAKE

(75) Inventor: Kyle M. Muramoto, Victorville, CA (US)

(73) Assignee: Mico Incorporated, North Mankato, MN (US)

(*) Notice: Subject to any disclaimer, the term of this patent is extended or adjusted under 35 U.S.C. 154(b) by 0 days.

(21) Appl. No.: 09/501,689

(22) Filed: Feb. 10, 2000

(51) Int. Cl.[7] ............................................. F16D 55/228
(52) U.S. Cl. ..................... 188/72.5; 188/71.5; 188/170; 192/91 R
(58) Field of Search .............................. 188/71.5, 72.1, 188/72.5, 170; 192/85 AA, 91 R, 86, 52.4

(56) References Cited

U.S. PATENT DOCUMENTS

| | | | | |
|---|---|---|---|---|
| 3,680,666 A | * | 8/1972 | Sommer ...................... | 188/170 |
| 3,770,085 A | * | 11/1973 | Cottingham ............... | 192/13 R |
| 3,863,038 A | * | 1/1975 | Kreitner et al. ............. | 188/170 |
| 3,927,737 A | * | 12/1975 | Prillinger et al. ......... | 188/106 F |
| 3,941,219 A | * | 3/1976 | Myers ......................... | 188/170 |
| 4,024,932 A | * | 5/1977 | Fay ............................. | 188/72.4 |
| 4,024,936 A | | 5/1977 | Crabb | |
| 4,078,637 A | * | 3/1978 | Hanks ........................ | 188/170 |
| 4,128,145 A | * | 12/1978 | Euler ......................... | 188/71.2 |
| 4,184,573 A | | 1/1980 | Bricker et al. | |
| 4,245,724 A | * | 1/1981 | Beck ........................... | 188/170 |
| 4,263,991 A | * | 4/1981 | Morgan et al. ............. | 188/170 |
| 4,607,730 A | * | 8/1986 | Paisley ....................... | 188/170 |
| 4,615,418 A | | 10/1986 | Atwell | |
| 4,625,837 A | | 12/1986 | Zimmer | |
| 4,645,039 A | * | 2/1987 | Lewis et al. ................ | 188/72.3 |
| 4,696,378 A | * | 9/1987 | Brooks ....................... | 188/170 |
| 4,872,535 A | * | 10/1989 | Dayen et al. ............... | 188/170 |
| 5,050,710 A | * | 9/1991 | Bargfrede .................. | 188/71.6 |
| 5,052,532 A | | 10/1991 | Plate | |
| 5,469,950 A | * | 11/1995 | Lundstrom .................. | 192/85 |
| 5,495,927 A | * | 3/1996 | Samie et al. .............. | 192/70.12 |
| 5,921,356 A | * | 7/1999 | Stringer, III et al. ... | 188/196 D |
| 6,073,731 A | * | 6/2000 | Ieda ............................ | 18/71.5 |
| 6,145,635 A | * | 11/2000 | White ........................ | 188/170 |
| 6,170,616 B1 | * | 1/2001 | White ........................ | 188/71.5 |

OTHER PUBLICATIONS

"AUSCO®—A Complete Guide to Selecting Failsafe Brakes" (Catalog F31145), *Auto Specialties Manufacturing Co.*, 48 pgs. (May 1987).

"Modular Multiple Disc Brake (Pressure Override—SAE B Size) Service Instructions", *MICO, Incorporated*, 4 pgs., (Jan. 1998).

Drawings of prior art brake shown at Figs. 1 and 2 of this application.

* cited by examiner

Primary Examiner—Paul N. Dickson
Assistant Examiner—Benjamin A Pezzlo
(74) Attorney, Agent, or Firm—Merchant & Gould P.C.

(57) ABSTRACT

The present disclosure relates to a braking device having a service brake and a parking brake. The braking device includes a housing and a shaft that extends at least partially through the housing. The shaft is rotatable relative to the housing about a longitudinal axis. A stack of plates is spaced axially along the shaft. At least one of the plates is adapted to rotate in concert with the shaft. The stack of plates includes a first axial end positioned opposite from a second axial end. A spring structure is provided for compressing the stack of plates together to provide the parking brake. The spring structure is mounted at the first axial end of the stack of plates. The braking device also includes a first piston for releasing the parking brake, and a second piston for actuating the service brake. The second piston actuates the service brake. The second piston is mounted at the second axial end of the stack of plates. When actuated, the second piston forces the plates axially toward the spring assembly such that the plates are compressed together to provide the service brake.

12 Claims, 6 Drawing Sheets

FIG.1
(Prior Art)

PARKING MODE

FIG.2 (Prior Art)

SERVICE MODE

COMBINED PARKING AND SERVICE BRAKE

FIELD OF THE INVENTION

The present invention relates generally to hydraulic brakes. More particularly, the present invention relates to hydraulic brakes that provide both parking brake and service brake functions.

BACKGROUND OF THE INVENTION

Figure 1:
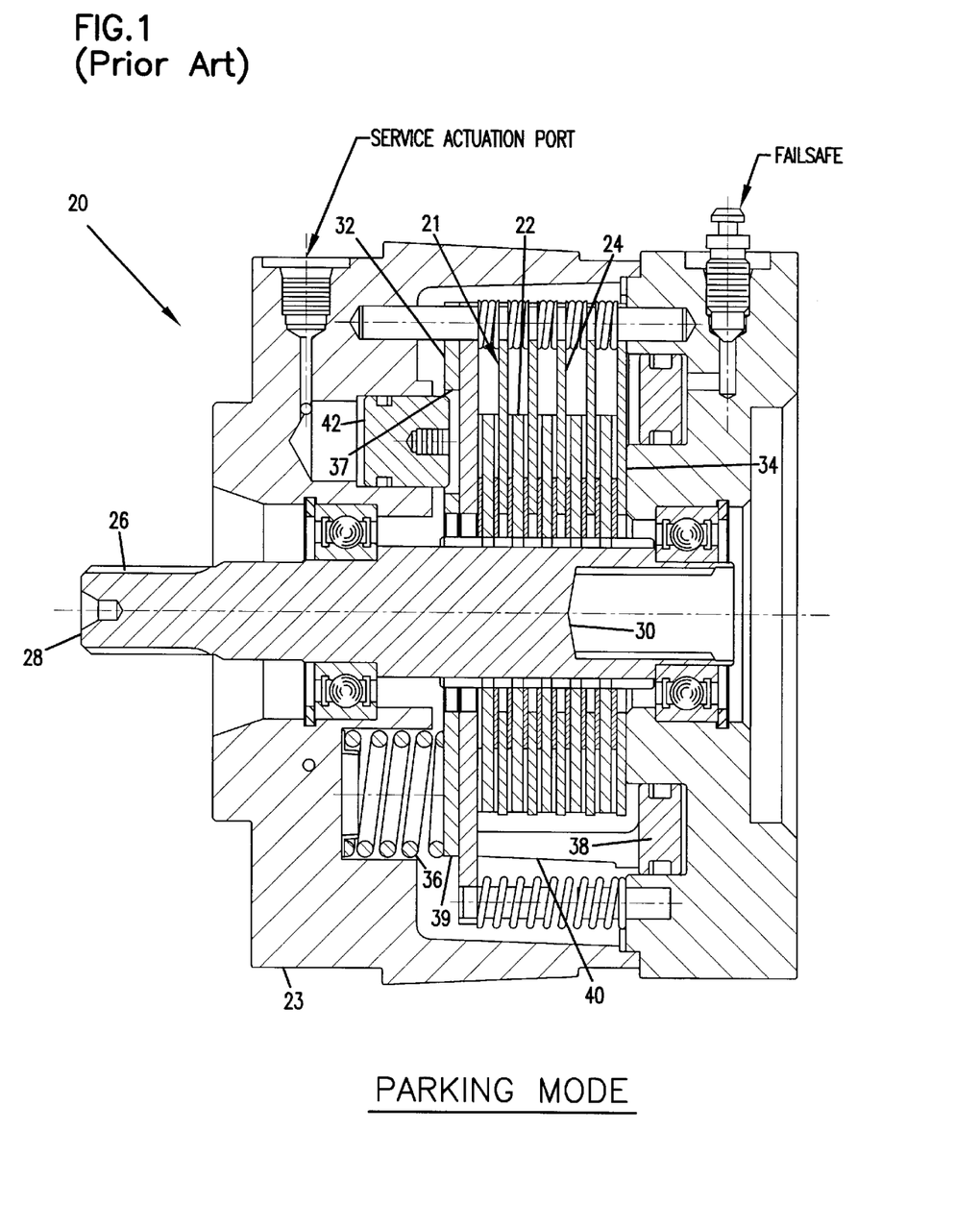
FIG. 1 is a cross sectional view of a prior art braking device, the braking device is shown in a parking brake mode.
Figure 2:
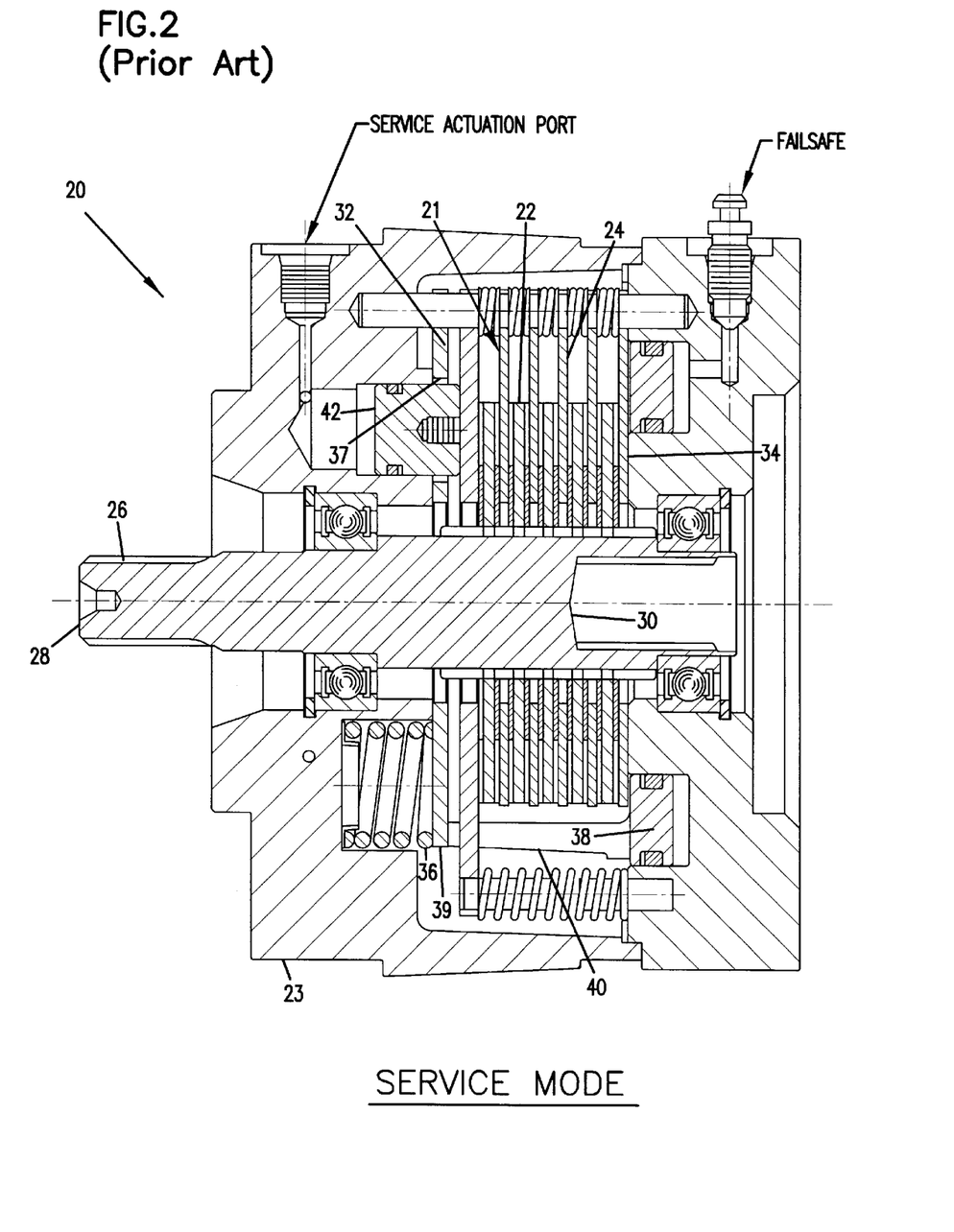
FIG. 2 is a cross sectional view of the braking device of FIG. 1 shown in a service brake mode.

Braking devices having combined service brakes and parking brakes are commonly used on vehicles such as mobile booms, pallet loaders, etc. FIGS. 1 and 2 illustrate one type of prior art braking device 20 capable of functioning as both a parking brake and a service brake. The braking device 20 includes a rotational shaft 26 that extends through a plurality of co-axially aligned rotor and stator plates 22 and 24. A first end 28 of the shaft is adapted for connection to a wheel, while a second end 30 of the shaft is adapted for connection to a drive source such as a hydraulic motor. The rotor plates 22 are adapted to rotate in concert with the shaft 26, while the stator plate 24 are prevented from rotating in concert with the shaft 26. The plates 22, 24 are enclosed within a housing 23.

The plates 22, 24 of the braking device 20 are arranged in a stack 21 having a first axial end 32 positioned opposite from a second axial end 34. A spring assembly 36 is positioned at the first axial end 32 of the stack 21. The spring assembly 36 provides a spring load for biasing the rotor and stator plates 22, 24 together to provide the parking brake. When the parking brake is engaged, the plates 22, 24 are compressed between the spring assembly 36 and the housing 23 such that friction between the plates 22, 24 prevents the shaft 26 from freely rotating.

The parking brake is disengaged by a first piston 38 positioned at the second axial end 34 of the stack 21. An axial extension 40 is provided for transferring force from the first piston 38 to a parking brake release plate 39 engaged by the spring assembly 36. When hydraulic pressure is applied to the first piston 38, the first piston 38 provides a force that overcomes the bias of the spring assembly 36 and moves the parking brake release plate 39 away from the remainder of the plates 22, 24. With the spring load removed from the plate stack 21, the plates 22, 24 are no longer compressed together and the parking brake is released.

The braking device 20 also includes a second piston 42 for actuating the service brake of the braking device 20. The second piston 42 is mounted at the first axial end 32 of the stack 21. When the service brake is actuated as shown in FIG. 2, hydraulic pressure applied to the second piston 42 causes the second piston 42 to compress the plate stack 21. To engage the plate stack 21, the second piston 42 travels through an opening 37 defined by the parking brake release plate 29. With the stack 21 compressed as shown in FIG. 2, friction between the plates 22, 24 provides a frictional braking action to the shaft 26.

The hydraulic brake industry is very competitive and cost is an important factor relating to the success or failure of any given product. As shown by the braking device of FIGS. 1 and 2, conventional combined parking and service brakes typically are fairly complicated. Therefore, such brakes are typically fairly expensive to manufacture. What is needed is a simplified and cost effective braking device that functions as both a parking brake and a service brake.

SUMMARY OF THE INVENTION

One aspect of the present invention relates to a braking device having a service brake and a parking brake. The braking device includes a housing and a shaft that extends at least partially through the housing. The shaft is rotatable relative to the housing about a longitudinal axis. The braking device also includes a stack of plates spaced axially along the shaft. At least one of the plates is adapted to rotate in concert with the shaft. The stack of plates includes a first axial end positioned opposite from a second axial end. A spring structure is provided for compressing the stack of plates together to provide the parking brake. The spring structure is mounted at the first axial end of the stack of plates. The braking device further includes a first piston for releasing the parking brake, and a second piston for actuating the service brake. The second piston is mounted at the second axial end of the stack of plates. In use, the second piston forces the plates axially toward the spring assembly to actuate the service brake.

Another aspect of the present invention relates to a method for actuating a service brake of a braking device that also includes a parking brake. The braking device includes a shaft that is rotatable about a longitudinal axis and is adapted for connection to a wheel. The braking device also includes a stack of plates spaced axially along the shaft with at least one of the plates being adapted to rotate in concert with the shaft. The braking device further includes a spring structure for biasing the plates together to provide the parking brake. The service brake of the braking device is actuated by forcing the stack of plates axially toward the spring structure thereby causing the plates to be compressed together to provide the service brake.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION reference will now be made in detail to illustrative aspects of the present invention that are illustrated in the accompanying drawings. Wherever possible, the same reference numbers will be used throughout the drawings to refer to the same or like parts.

Figure 3:
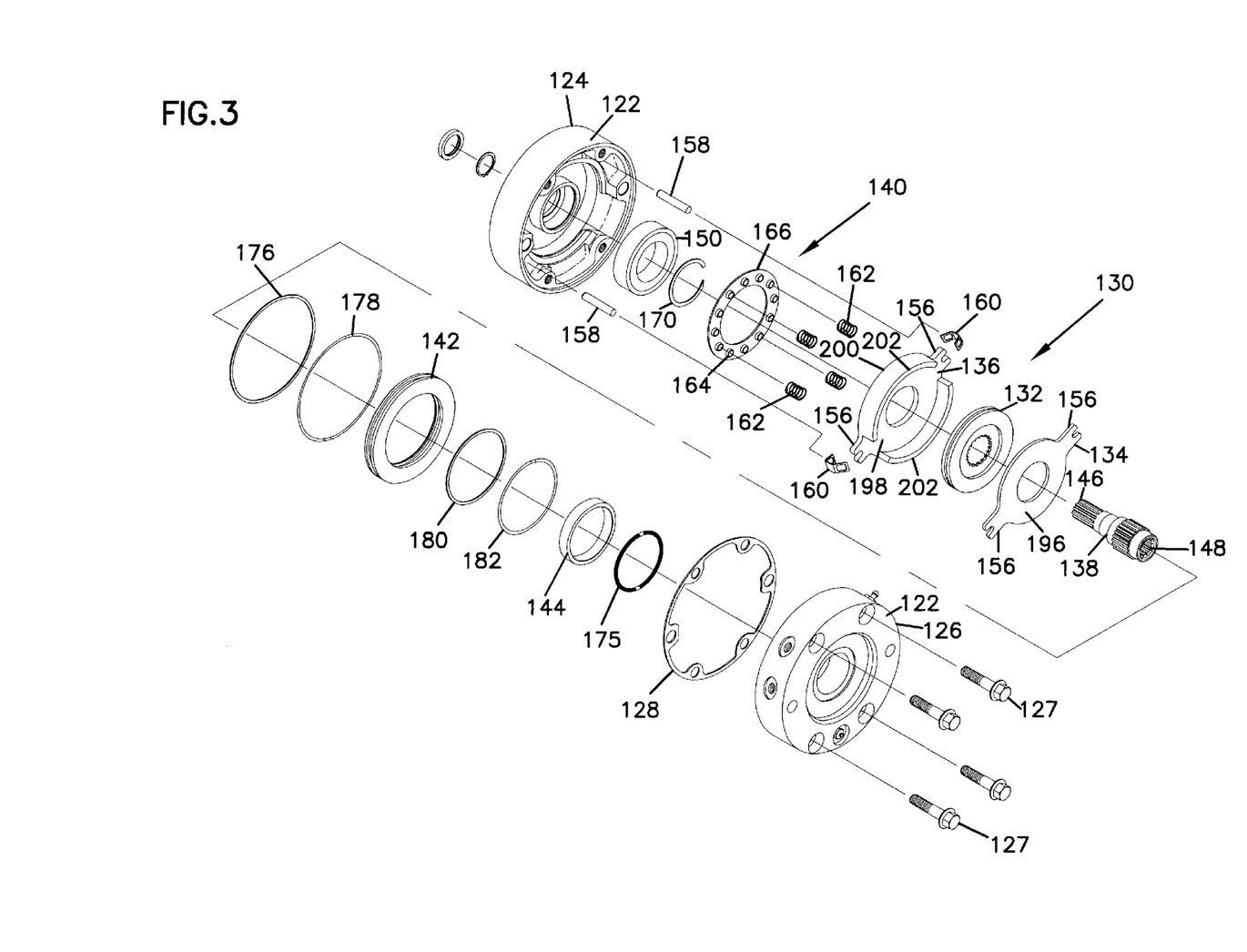
FIG. 3 is an exploded, perspective view of a braking device constructed in accordance with the principles of the present invention.

FIG. 3 illustrates a braking device 120 constructed in accordance with the principles of the present invention. The braking device 120 includes a housing 122 having a cover 124 that mounts to a pressure plate 126. An annular case seal 128 mounts between the cover 124 and the pressure plate 126 to seal the housing 122. The cover 124 and the pressure plate 126 are preferably interconnected by conventional fasteners 127 (e.g., screws, bolts, etc.). A stack assembly 130 mounts within the housing 122. The stack assembly 130 includes a rotor plate 132 that mounts between first and second stator plates 134 and 136. A shaft 138 is provided that is rotatable relative to the housing 122 about a longitudinal axis 139 (shown in FIGS. 4–6). The shaft 138 preferably mounts at least partially within the housing 122 and preferably extends through the plates 132–136. When assembled, the rotor plate 132 rotates in concert with the shaft 138, and the stator plates 134, 136 are prevented from rotating with the shaft 138.

Figure 4:
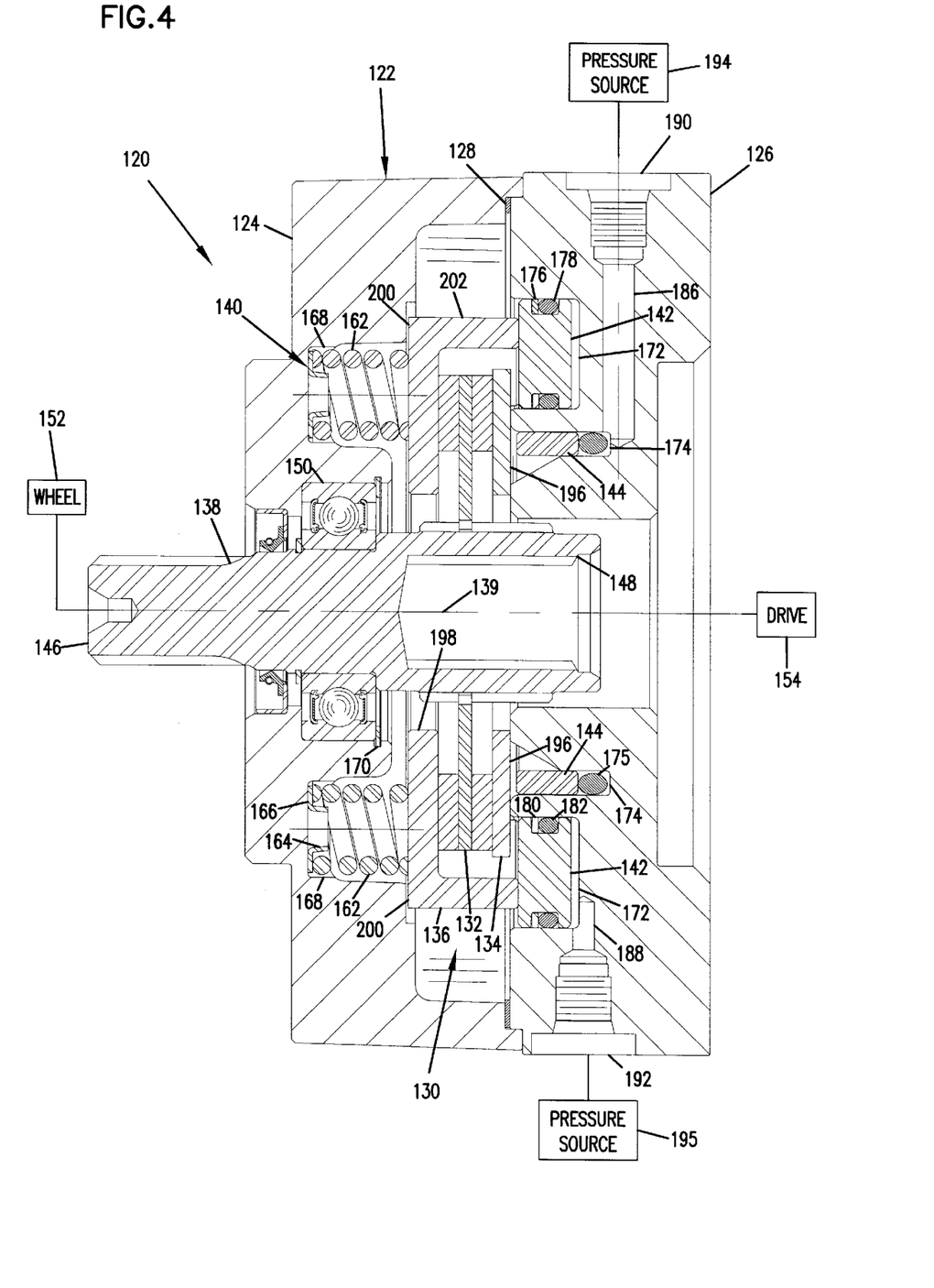
FIG. 4 is a longitudinal, cross sectional view of the braking device of FIG. 3, the braking device is shown assembled and in a parking brake mode.
Figure 5:
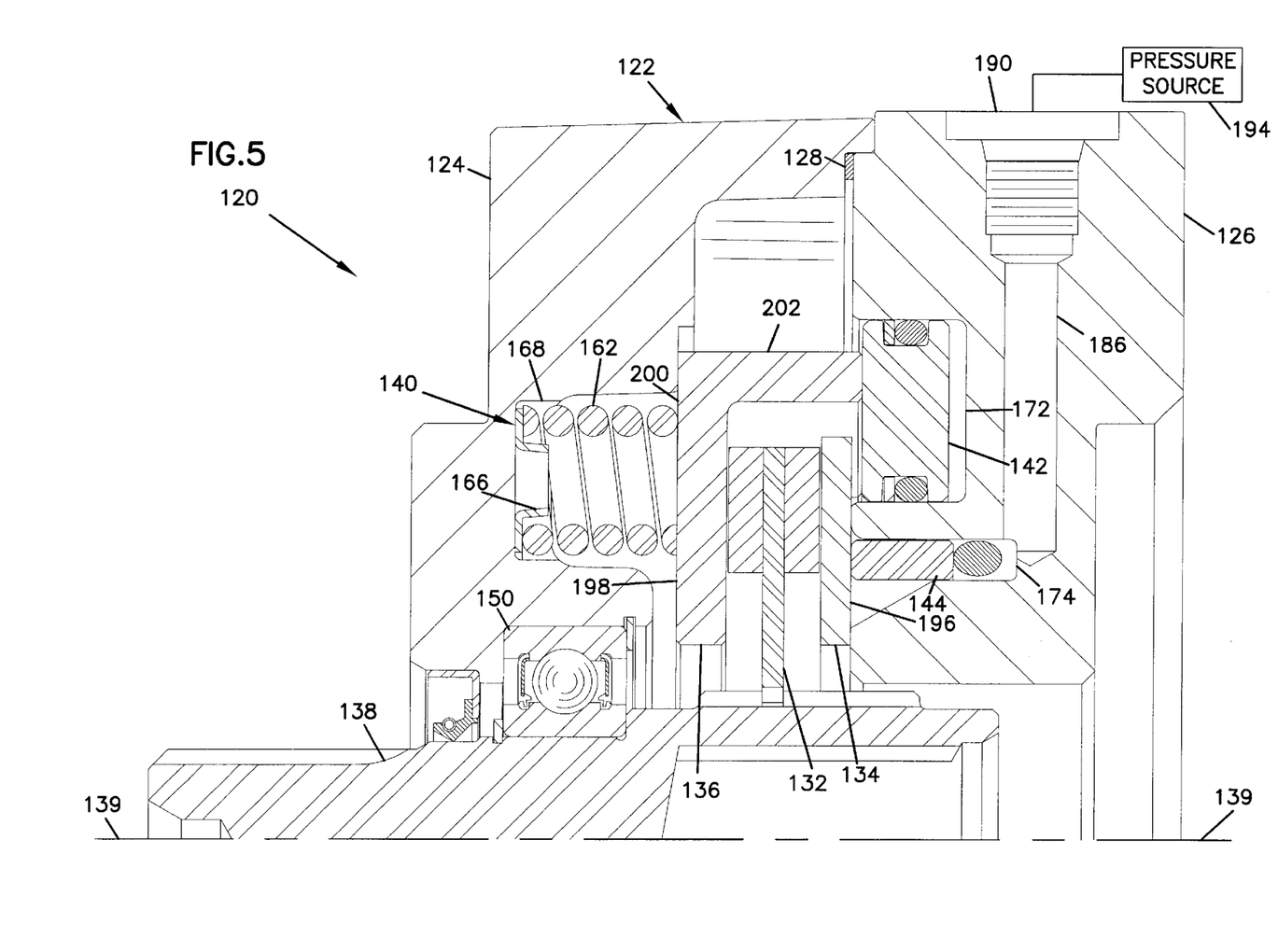
FIG. 5 is a longitudinal, cross sectional view of the braking device of FIG. 3, the braking device is shown assembled with the parking brake disengaged.
Figure 6:
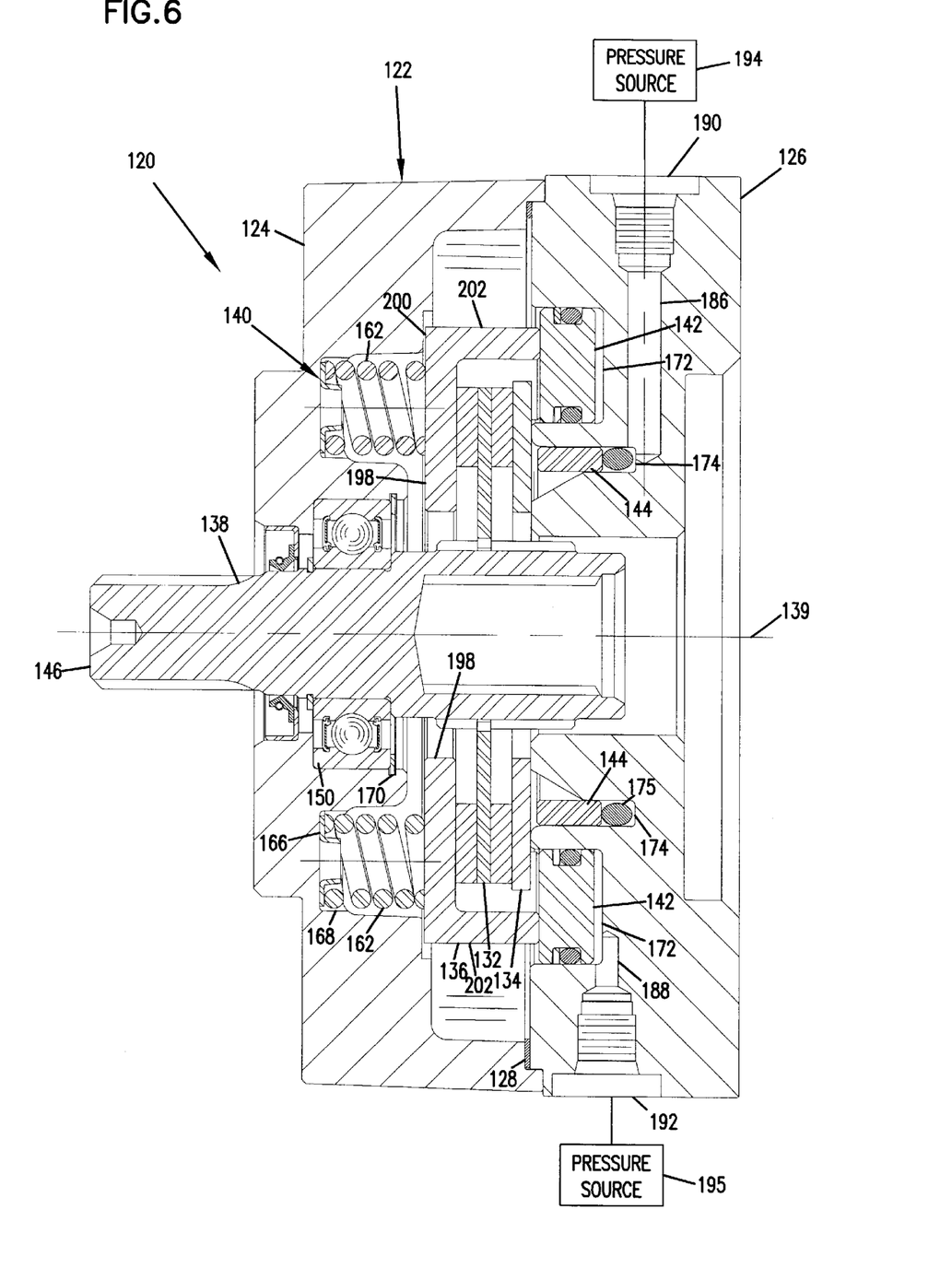
FIG. 6 is a longitudinal, cross sectional view of the braking device of FIG. 3, the braking device is shown assembled and in a service brake mode.

The braking device 120 also includes a spring assembly 140 for compressing the plates 132–136 together to provide a parking brake function. The spring assembly 140 includes a plurality of coil springs 162. The coil springs 162 mount on posts 164 formed on an annular spring retainer 166. As shown in FIGS. 4–6, the spring retainer 166 mounts within an annular chamber 168 defined by the housing cover 124. As so mounted, the coil springs 162 are positioned between the housing cover 124 and the second stator plate 136 of the stack assembly 130.

The braking device 120 further includes a first piston 142 for releasing or disengaging the parking brake, and a second piston 144 for applying the service brake. The first and second pistons 142 and 144 are preferably mounted within the pressure plate 126 of the housing 122. When actuated, the first piston 142 releases the parking brake by forcing the second stator plate 136 away from the rotor plate 132 such that the plates 132–136 are no longer compressed together by the spring assembly 140. When actuated, the second piston 144 compresses the plates 132–136 together to provide a service brake function.

The shaft 138 of the braking device 120 includes a first end 146 positioned opposite from a second end 148. When the shaft 138 is mounted in the housing as shown in FIGS. 4–6, the first end 146 of the shaft 138 preferably projects out of the housing 122. A bearing 150 is mounted between the shaft 138 and the housing 122 to allow the shaft 138 to freely rotate relative to the housing 122 about the longitudinal axis 139. The bearing 150 is held within the housing 122 by a retaining ring 170. The first end 146 of the shaft 138 is preferably adapted for connection to a structure such as a wheel 152 (shown schematically in FIG. 4). For example, the first end 146 of the shaft 138 can include external splines adapted to interlock with corresponding internal splines (not shown) of the wheel 152. The second end 148 of the shaft 138 is preferably adapted for connection to a drive unit 154 (shown schematically in FIG. 4) such as a hydraulic motor. For example, the second end of the shaft 148 is shown including internal splines adapted to interlock with corresponding external splines (not shown) of the drive unit 154. While the first and second ends 146, 148 of the shaft 138 are shown as being splined, it will be appreciated that any type of connection suitable for transferring torque could be used. Examples of other types of structures for transmitting torque include keyways, noncircular cross sectional regions, hexagonal cross sectional regions, or any type of cross sectional region having flats or surface irregularities for preventing relative rotation.

The first and second stator plates 134 and 136 of the braking device 120 include structure for preventing the stator plates from rotating in concert with the shaft 138. For example, as shown in FIG. 3, the stator plates 134, 136 are include radial ears 156 that receive dowel pins 158 mounted within the housing 122. The stack assembly 130 also includes a pair of spring clips 160 that function to bias the first stator plate 134 toward the pressure plate 126.

The rotor plate 132 of the braking device 120 preferably includes structure for causing the rotor plate 132 to rotate in concert with the shaft 138. For example, the rotor plate 132 is shown including internal splines that intermesh with corresponding external splines defined by the shaft 138. While splines have particularly been shown, it will be appreciated that any type of structure suitable for transferring torque between two members could be used.

Referring to FIG. 3, the first and second pistons 142 and 144 of the braking device 120 both have a generally annular configuration. As shown in FIGS. 4–6, the first and second pistons 142 and 144 are respectively mounted within corresponding first and second annular piston chambers 172 and 174 defined by the pressure plate 126 of the housing 122. The first and second piston chambers 172 and 174 are both concentric about the longitudinal axis 139 of the shaft 138. The second piston chamber 174 is positioned inside the first piston chamber 172. To seal the first annular piston chamber 172, two annular seals 176, 178 are mounted outside the first piston 142, and two annular seals 180 and 182 are mounted inside the first piston 142. To seal the second annular piston chamber 174, a single annular seal 175 is provided within the second annular piston chamber 174. Of course, other sealing configurations (e.g., multiple seals) could also be used.

Referring still to FIGS. 4–6, the pressure plate 126 preferably defines separate first and second hydraulic fluid passages 186 and 188. The first fluid passage 186 extends from the first annular piston chamber 172 to a first port 190, and the second fluid passage 188 extends from the second annular chamber 174 to a second port 192. The first and second ports 190 and 192 are adapted for allowing the first and second fluid passages 186 and 188 to be placed in fluid communication with sources of hydraulic pressure 194, 195 (e.g., master cylinders, hydraulic actuators, pumps, vehicle hydraulic systems, power brake valves, etc.). The source of pressure 194 is used to actuate the first piston 142 (i.e., move the first piston 142 within the first chamber 172), and the source pressure 195 is used to actuate the second piston 144 (i.e., move the second piston 144 within the second chamber 174). Additional ports can be provided to facilitate connecting hydraulic lines to the braking device 120. When not in use, such additional ports are preferably plugged.

Referring once again to FIGS. 4–6, the first stator plate 134 includes an outer surface 196 that defines a first axial end of the stack assembly 130. The outer surface 196 faces toward the second piston 144. Similarly, the second stator plate 136 includes a plate portion 198 having an outer surface 200 that defines a second axial end of the stack assembly 130. The outer surface 200 faces toward the spring assembly 140 of the braking device 120. In addition to the plate portion 198, the second stator plate 136 also includes two axial extensions 202 that extend axially from the plate portion 198 to the first piston 142. As will be described later in the specification, the axial extensions 202 are configured to allow the first piston 142 to force the second stator plate 136 toward the cover 124 to release the parking brake.

FIG. 4 shows the braking device 120 in a parking brake mode. In the parking brake mode, preferably no hydraulic pressure is provided to either the first or second piston chambers 172 and 174. Additionally, the coil springs 162 of the spring assembly 140 bias the second stator plate 136 in an axial direction toward the pressure plate 126 such that the plates 132–136 are compressed between the springs 162 and the pressure plate 126. In this compressed configuration, contact between the rotor plate 132 and the stator plates 134, 136 provides friction that resists rotation of the shaft 138 such that a braking action is achieved.

FIG. 5 shows the braking device 120 with the parking brake disengaged. To disengage the parking brake, hydraulic pressure from the pressure source 194 is applied to the first piston chamber 174 thereby causing the first piston 142 to slide axially toward the housing cover 124. As the first piston 142 slides toward the cover 124, the first piston 142 engages the axial extensions 202 of the second stator plate 136 and pushes the second stator plate 136 away from the rotor plate 132 with sufficient force to overcome the spring load provided by the coil springs 162. In this manner, the second stator plate 136 disengages from the rotor plate 132. Thus, the plates 132–136 are no longer compressed together by the springs 162, and the rotor plate 132 is free to spin relative to the stator plates 143, 136 with minimal friction.

With the parking brake disengaged, the service brake is actuated by applying hydraulic pressure from the pressure source 195 to the second piston chamber 174 such that the second piston 144 is caused to move axially toward the housing cover 124. As the second piston 144 moves toward the housing cover 124, the second piston 144 engages the first stator plate 134 thereby causing the plates 132–136 to be compressed between the second piston 144 and the housing cover 124. FIG. 6 shows the braking device 120 with the plates compressed together as described above. As so compressed, the stator plates 134, 136 frictionally engage the rotor plate 132 to provide a braking action to the shaft 138. In this manner, the axial movement of the second piston 144 toward the cover 124 functions to actuate the service brake of the braking device 120.

An important aspect of the present invention is that the spring assembly 140 and the second piston 144 are mounted at opposite axial ends of the stack assembly 130. Thus, to actuate the service brake of the braking device 120, the second piston 144 moves axially toward the spring assembly 140. By mounting the second piston 144 opposite from the spring assembly 140, both the first piston 142 and the second piston 144 can be mounted in a common piece of the housing 122. This is advantageous because such a mounting configuration is simpler and more cost effective than conventional mounting configurations such as the configuration shown in FIGS. 1 and 2.

As used herein, the term "axially" is intended to mean in a direction generally along or parallel to the longitudinal axis 139 of the shaft 138. Also, while coil springs have been shown as part of the spring assembly 140, it will be appreciated that any structure capable of providing a biasing force to the stack assembly 130 could be used. For example, alternative spring assemblies or structures could include elastomeric members or flat spring members.

With regard to the foregoing description, it is to be understood that changes may be made in detail, especially in matters of the construction materials employed and the shape, size, and arrangement of the parts without departing from the scope of the present invention. For example, while one rotor plate and two stator plates have been shown, it will be appreciated that different numbers of plates could be used without departing from the principles of the present invention. Also, while the disclosed brake has been described as being used with a vehicle wheel, the brake could also be used for any type of device where it is desired to control rotation of a rotary member. It is intended that the specification and depicted aspects be considered exemplary only, with a true scope and spirit of the invention being indicated by the broad meaning of the following claims.

What is claimed is:

1. A braking device having service brake and a parking brake, the braking device comprising:

a housing including at least a one-piece pressure plate and a cover, the one-piece pressure plate and the cover being arranged in opposition with respect to one another, the one-piece pressure plate defining first and second piston chambers;

a shaft that extends at least partially through the housing, the shaft being rotatable relative to the housing about a longitudinal axis;

a rotor plate mounted on the shaft, the rotor plate being adapted to rotate in concert with the shaft about the longitudinal axis;

a first stator plate positioned between the rotor plate and the one-piece pressure plate;

a second stator plate including a plate portion positioned between the cover and the rotor plate;

a spring structure mounted between the cover and the second stator plate, the spring structure being arranged and configured to bias the second stator plate against the rotor plate to provide the parking brake;

a first piston for releasing the parking brake by forcing the second stator plate away from the rotor plate with sufficient force to overcome the bias of the spring structure, the first piston being mounted within the first piston chamber; and a second piston for actuating the service brake by forcing the first stator plate axially toward the spring structure and against the rotor plate, the second piston being mounted within the second piston chamber.

2. The braking device of claim 1, wherein the second stator plate includes an extension that extends axially from the plate portion to the first piston.

3. The braking device of claim 1, wherein the pressure plate defines a first hydraulic passage in fluid communication with the first piston chamber for allowing the first piston to be hydraulically actuated, and the pressure plate also defines a separate second hydraulic passage in fluid communication with the second piston chamber for allowing the second piston to be hydraulically actuated.

4. The braking device of claim 1, wherein the first piston chamber and the first piston are both annular.

5. The braking device of claim 1, wherein the second piston chamber and the second piston are both annular.

6. The braking device of claim 4, wherein the second piston chamber and the second piston are both annular.

7. The braking device of claim 6, wherein the second piston chamber has a smaller diameter than the first piston chamber.

8. The braking device of claim 6, wherein the first and second piston chambers are concentrically positioned about the longitudinal axis of the shaft.

9. The braking device of claim 1, wherein the spring structure includes a plurality of coil springs.

10. A braking device having a first brake and second brake, the braking device comprising:

a housing;

a shaft that extends at least partially through the housing, the shaft being rotatable relative to the housing about a longitudinal axis;

a stack of plates spaced axially along the shaft, at least one of the plates being adapted to rotate in concert with the shaft, the stack of plates including a first axial end positioned opposite from a second axial end;

a spring structure arranged and configured to compress the stack of plates together to provide the first brake, the spring structure being mounted at the first axial end of the stack of plates;

a first piston for releasing the first brake; and a second piston for actuating the second brake by compressing the plates together, the second piston being mounted at the second axial end of the stack of plates, wherein the second piston forces the plates axially toward the spring structure to actuate the second brake.

11. The braking device of claim 10, wherein the first piston is mounted at the second axial end of the stack of plates.

12. A method for actuating a service brake of a braking device that also includes a parking brake, the braking device including a shaft that is rotatable about a longitudinal axis and is adapted for connection to a wheel, the braking device also including a stack of plates spaced axially along the shaft with at least one of the plates being adapted to rotate in concert with the shaft, the braking device further including a spring structure for biasing the plates together to provide the parking brake, the method comprising:

forcing the stack of plates axially toward the spring structure thereby causing the plates to be compressed together to provide the service brake.

\* \* \* \* \*